UNITED STATES PATENT OFFICE.

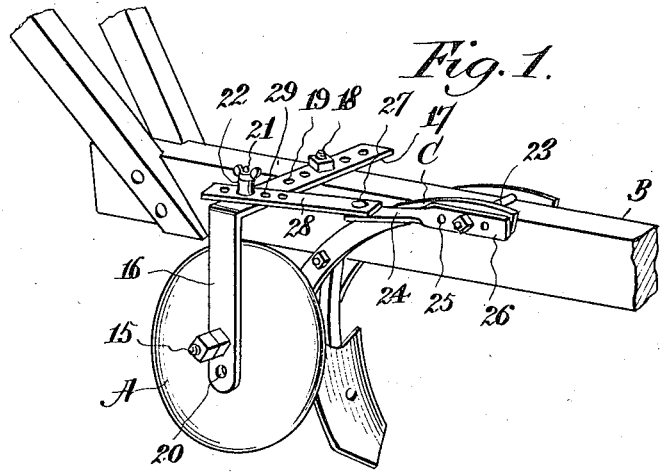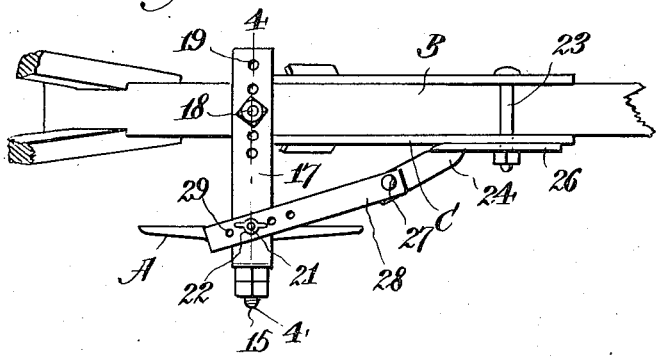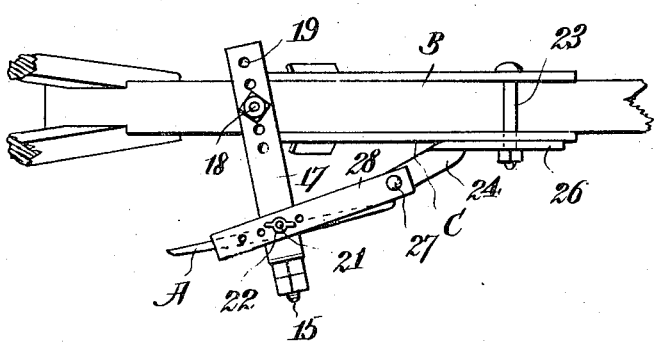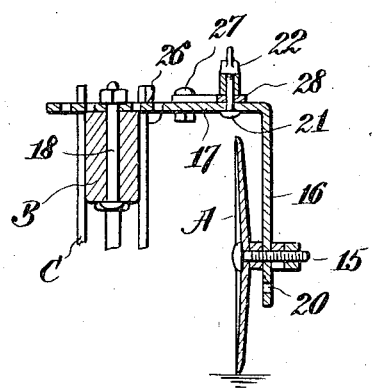

ZACHARIAH T. McMURRAY, OF ADDISON, ALABAMA.

FENDER FOR PLOWS.

1,179,204.   Specification of Letters Patent.   Patented Apr. 11, 1916.

Application filed November 17, 1915. Serial No. 62,031.

*To all whom it may concern:*

Be it known that I, ZACHARIAH T. MCMURRAY, a native-born citizen of the United States, residing at Addison, in the county of Winston and State of Alabama, have invented new and useful Improvements in Fenders for Plows, of which the following is a specification.

This invention relates to fenders for plows, and it has for its object to produce a rolling fender of simple and improved construction.

A further object of the invention is to simplify and improve the manner of mounting the fender and of connecting it with the plow.

A further object of the invention is to so construct the attaching means that provision will be made for adjusting the fender in various ways to place it in the most convenient position for successful operation.

With these and other ends in view which will readily appear as the nature of the invention is better understood, the same consists in the improved construction and novel arrangement and combination of parts which will be hereinafter fully described and particularly pointed out in the claims.

In the accompanying drawing has been illustrated a simple and preferred form of the invention, it being, however, understood that no limitation is necessarily made to the precise structural details therein exhibited, but that changes, alterations and modifications within the scope of the claims may be resorted to when desired.

In the drawing, Figure 1 is a perspective view showing a portion of a plow equipped with the improved fender attachment. Fig. 2 is a top plan view. Fig. 3 is a top plan view showing the fender disposed angularly with respect to the plow beam. Fig. 4 is a transverse sectional view taken on the line 4—4 in Fig. 2.

Corresponding parts in the several figures are denoted by like characters of reference.

The fender A which consists of a conventional plow or harrow disk is mounted for rotation on an axial bolt 15 which extends through and is supported by an arm 16 depending from one end of a cross bar 17 which, together with said arm, constitutes an angular bracket which is mounted on top of a plow beam B by means of a vertical bolt 18 for the passage of which the cross bar 17 is provided with spaced apertures 19. The arm 16 has a plurality of apertures 20 for the passage of the bolt 15 to enable the fender to be raised or lowered, as may be desired, with respect to the plow. The cross bar 17 is also provided near the downwardly extending arm 16 with a bolt 21 extending upwardly therethrough and having a wing nut 22.

The plow beam B is equipped with the plow carrying standard C which is mounted on the beam by means including a transverse bolt 23 which also serves for the attachment of a bracket 24 consisting of a strap of iron or steel having a plurality of apertures 25 for the passage of the bolt 23, said strap having an arm or extension 26 which is twisted or turned so as to lie in a plane substantially at right angles to the plane of the body of the bracket 24 with respect to which the arm 25 also extends obliquely and outwardly from the beam B. The arm 26 is connected by a pivot member 27 with one end of a link 28, the other end of which has a plurality of apertures 29, any one of which may be placed in engagement with the bolt 21 that projects upwardly from the cross bar 17 and where said link may be secured by means of the wing nut 22.

The several apertures 19 in the cross bar 17 enable the said cross bar to be adjusted so as to vary the distance between the depending arm 16 and the plow. When such adjustment is made, the bracket 24 may be moved forwardly or rearwardly with respect to the plow beam, and adjustment may likewise be made between the apertured link 28 and the bolt 21 to preserve parallelism between the fender and the plow beam or to effect angular adjustment between the fender and the plow beam, as will be seen by reference to Fig. 3. It follows that the fender is capable of being used for simply protecting the plants while being cultivated without displacing the dirt, while by proper adjustment the dirt may be moved toward or away from the plants, as may be desired. The fender disk may also be reversed so as to present either its concave or convex face toward the plants, as may be desired and required in order to obtain the desired results.

Having thus described the invention, what is claimed as new, is:—

1. The combination with a plow beam having a plow carrying standard, of a fender attachment comprising a cross bar mounted on the plow beam for transverse adjustment with respect to said beam and having a depending arm at one end, a fender disk supported for rotation on said arm, a bracket mounted on the side of the plow beam for longitudinal adjustment and having an obliquely extending arm disposed in a plane substantially at right angles to the body of the bracket, and a link pivoted on said arm and connected adjustably with the cross bar having the depending arm at a point near said arm.

2. A plow beam having a plow carrying standard and a transverse bolt whereby said standard is secured, a bracket adjustably engaging said bolt and having a rearwardly extending obliquely disposed arm, a cross bar mounted on top of the beam for transverse adjustment with respect to the latter and having at one end a depending arm, a fender disk rotatably supported by said arm, and a link adjustably connecting the cross bar with the obliquely disposed arm of the longitudinally adjustable bracket.

In testimony whereof I affix my signature in presence of two witnesses.

ZACHARIAH T. McMURRAY.

Witnesses:
JAS. W. CURTIS,
B. H. VEOZEY.

Copies of this patent may be obtained for five cents each, by addressing the "Commissioner of Patents, Washington, D. C."